UNITED STATES PATENT OFFICE.

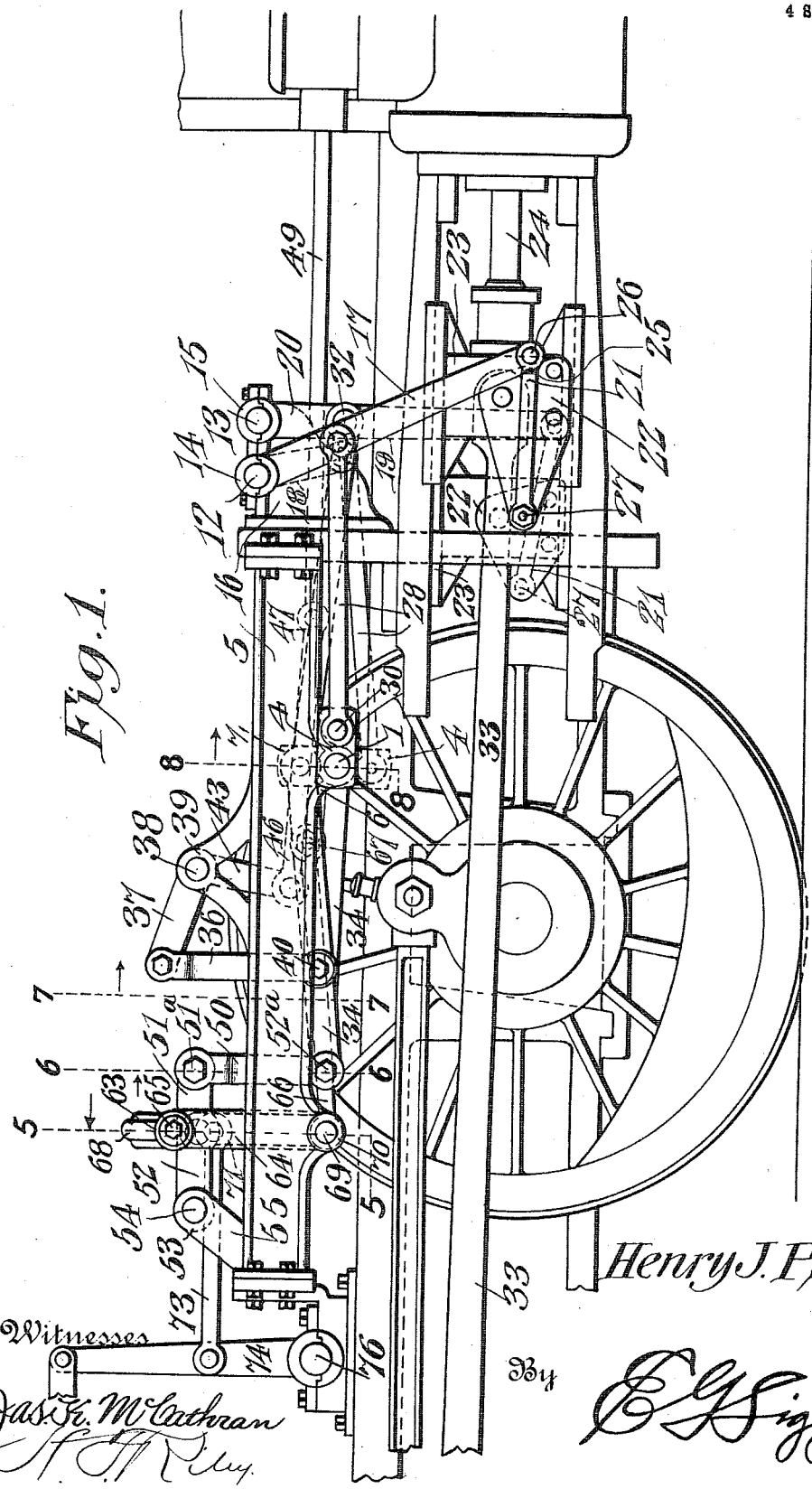

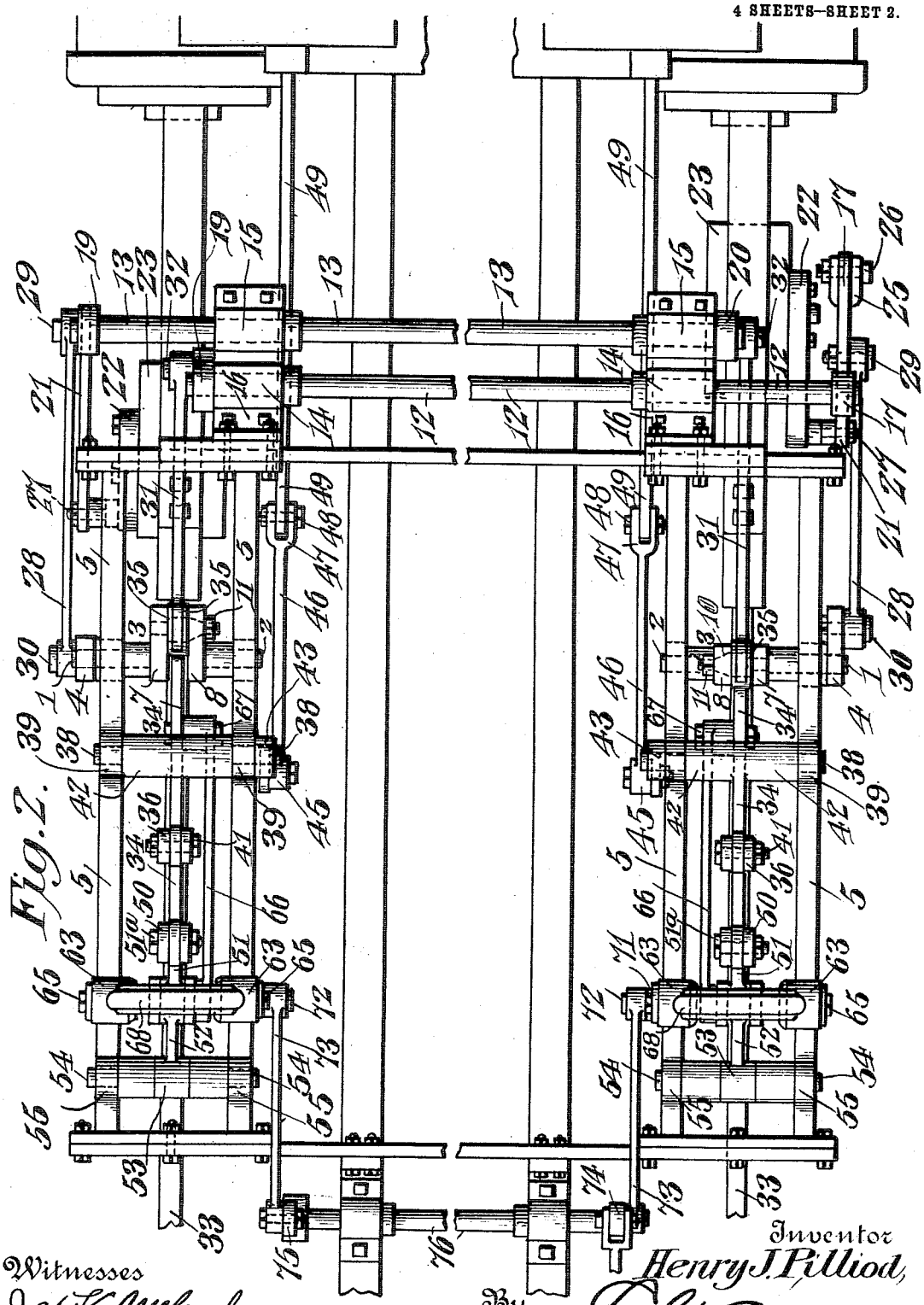

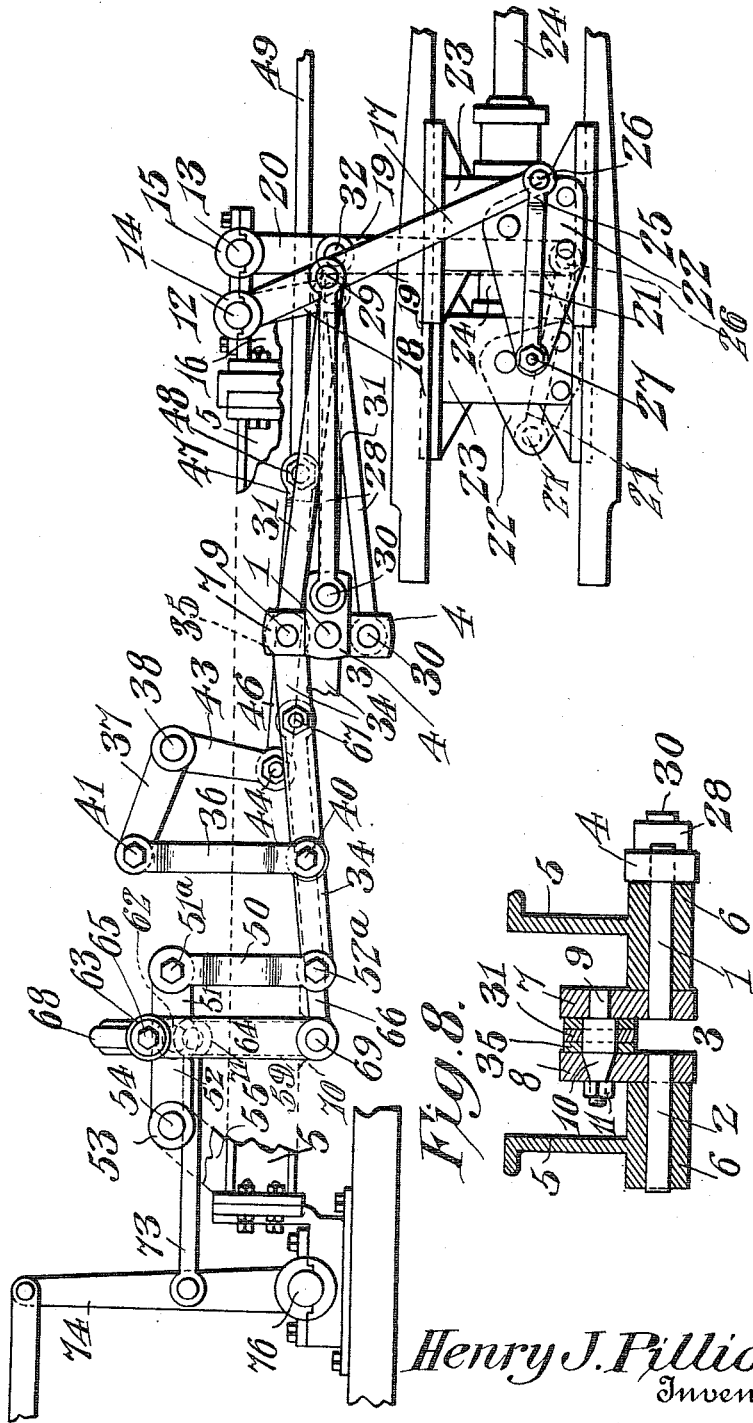

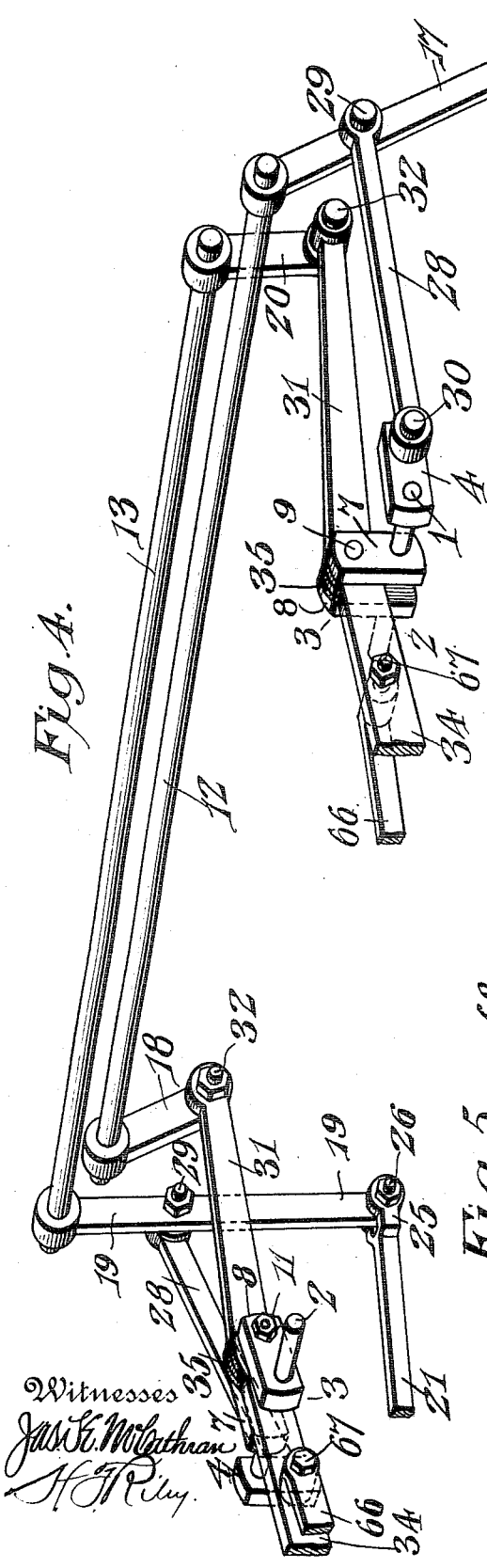
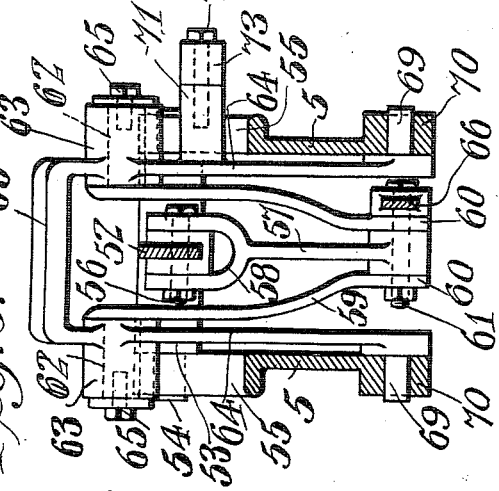

HENRY J. PILLIOD, OF CHICAGO, ILLINOIS, ASSIGNOR TO THE PILLIOD BROTHERS COMPANY, OF TOLEDO, OHIO.

LOCOMOTIVE VALVE-GEAR.

982,991.             Specification of Letters Patent.       Patented Jan. 31, 1911.

Application filed June 28, 1910. Serial No. 569,411.

*To all whom it may concern:*

Be it known that I, HENRY J. PILLIOD, a citizen of the United States, residing at Chicago, in the county of Cook and State of Illinois, have invented a new and useful Locomotive Valve-Gear, of which the following is a specification.

The invention relates to improvements in valve gears for locomotives.

The object of the present invention is to improve the construction of valve gears for locomotives, more especially the means for mounting and actuating the imparting motion device, described and claimed in a companion application, filed May 2, 1910, Serial No. 558,822, and to enable the valve gear, the imparting motion device and the means for connecting the latter to the actuating parts of a locomotive to be mounted on the frame of the engine, whereby uniform rotative speed undisturbed and unaffected by vibration and lateral motion, such as occurs in locomotive gears by reason of the yielding of the springs in running over inequalities of the track, will be secured and such vibration and lateral movement prevented from affecting the travel of the valve and the uniform distribution of steam.

With these and other objects in view, the invention consists in the construction and novel combination of parts hereinafter fully described, illustrated in the accompanying drawings, and pointed out in the claims hereto appended.

In the drawings:—Figure 1 is a side elevation of a portion of a locomotive provided with a valve gear, constructed in accordance with this invention. Fig. 2 is a plan view of the same. Fig. 3 is an enlarged elevation of the valve gear. Fig. 4 is a detail perspective view of the mechanism for transmitting motion from the cross heads to the imparting motion devices. Fig. 5 is a transverse sectional view on the line 5—5 of Fig. 1. Fig. 6 is a similar view on the line 6—6 of Fig. 1. Fig. 7 is a transverse sectional view on the line 7—7 of Fig. 1. Fig. 8 is a transverse sectional view on the line 8—8 of Fig. 1.

Like numerals of reference designate corresponding parts in all the figures of the drawings.

The specification is a disclosure of one form of the invention, while the claims define the actual scope of the invention.

In the embodiment of the invention illustrated in the accompanying drawings, the valve gear is equipped with an imparting motion device, constructed as shown and described in the aforesaid application, and comprising a central rotary shaft or pivot composed of two sections 1 and 2, and equipped with two cranks 3 and 4, arranged at an angle of ninety degrees. The imparting motion device is mounted in the gear frame 5, which is provided at opposite sides with depending bearings 6, receiving the sections 1 and 2 of the rotary shaft. The crank 3 is composed of two arms 7 and 8, rigidly secured to the inner ends of the sections 1 and 2 of the central shaft or pivot, and connected by a crank pin 9, fixed to the arm 7 and provided with a central bearing portion and having a tapered conical portion 10 to fit in a corresponding opening of the arm 8 of the crank 3. The crank pin 9 is threaded beyond the conical portion to receive a nut 11, which retains the arm 8 on the conical portion of the crank pin. The crank 4 is suitably fixed to the outer end of the section 1 of the central shaft or pivot.

The imparting motion devices of the valve gears at opposite sides of the locomotive are actuated to secure uniform rotative speed by means of a pair of transverse rock shafts 12 and 13, arranged in parallelism in advance of the imparting motion devices and extending entirely across the locomotive and journaled in bearings 14 and 15 of opposite brackets 16, secured to the gear frames at the front ends thereof, or to other fixed portions of the locomotive. The transverse rock shaft 12 is provided at its ends with long and short depending arms 17 and 18, and the other rock shaft 13 is equipped with similar, but reversely arranged long and short depending arms 19 and 20. The long arm of the rock shaft 12 is arranged at the right hand side of the locomotive, and the long arm 18 of the other rock shaft 13 is arranged at the left hand side of the locomotive, while the short arms of the two rock shafts are also located at opposite sides of the locomotive. The cranks 3 of the imparting motion devices are located midway between the sides of the valve gear frames, and the other cranks 4 are arranged beyond the valve gear frames at the outer sides thereof, as clearly illustrated in Fig. 2 of the drawings. The arms of the rock shafts are arranged at the terminals thereof, and the left hand end of the rock shaft 12 is arranged in alinement with the crank 3 of the imparting motion device at the left hand side of the locomotive. The other end of the rock shaft 12 is extended to arrange its long arm in alinement with the outer crank 4 of the imparting motion device at the right hand side of the locomotive. The rock shaft 13 is reversely arranged, being extended at the left hand side to position the long arm in alinement with the outer crank of the left hand imparting motion devices, and its other end being terminated short of the right hand end of the rock shaft 12 in order to arrange its short arm in the longitudinal plane of the crank 3 of the right hand imparting motion device.

The long arms 17 and 19 constitute levers and are connected at their lower ends by approximately horizontal links 21 with plates 22, secured to the cross heads 23 of piston rods 24, and extending rearwardly therefrom to provide approximately horizontal projecting arms. The links 21, which are disposed longitudinally of the locomotive, extend rearwardly from the lower ends of the arms or levers 17 and 19, and their front terminals 25 are bifurcated to straddle the arms or levers 17 and 19 and are pivoted to the same by bolts 26, but any other form of pivotal connection may be employed. The rear ends of the links 21 are pivoted to the projecting plates or arms 22 of the cross head by bolts 27, or other suitable fastening means. The long arms or levers 17 and 19 are also connected at an intermediate point by links or rods 28 with the cranks or crank elements of the imparting motion devices. The links or rods 28, which are approximately horizontal, extend longitudinally of the locomotive and are pivoted at their front ends to the arms or levers 17 and 19 by bolts 29, and their rear ends are mounted on the crank pins or pivots 30 of the cranks 4 of the imparting motion devices.

The short arms 18 and 20 of the transverse rock shafts are connected by longitudinally disposed links or rods 31 with the cranks 3 of the imparting motion devices. The links or rods 31, which are also approximately horizontal, are pivoted at their front ends to the lower terminals of the short links 18 and 20 by bolts 32, or other fastening means, and their rear ends are mounted on the crank pins 9 of the cranks 3 of the imparting motion devices. The main cranks (not shown) of the locomotive are set at ninety degrees to each other as usual, and the cross heads, which are connected with the main cranks by main rods 33 when reciprocated by the pistons, oscillate the depending arms of the transverse rock shafts. While one piston and its crank of the imparting motion device at that side of the locomotive are traveling at their highest longitudinal speed, the other crank of such imparting motion device is rounding the dead center, and the other cross head to which it is connected is at its slowest longitudinal speed or motion, and when the first-mentioned cross head is at its slowest longitudinal speed or motion, the other cross head is traveling at its greatest speed.

By connecting each imparting motion device with each of the cross heads, a uniform rotative speed unaffected by the vibration and lateral motion of the locomotive results in each of the imparting motion devices. The crank 3 of each imparting motion device is also connected by an eccentric arm or rod 34 with a valve gear, located in rear of the imparting motion device and having a reverse of the "Marshall" type, constructed substantially the same as that illustrated in the aforesaid application. The eccentric arm or rod 34, which corresponds with the eccentric arm of the said application, extends rearwardly from the imparting motion device, its front end 35, which is connected with the imparting motion device, being preferably forked or bifurcated to straddle the rear end of the link or rod 31. The eccentric arm 34, which receives a longitudinal reciprocatory motion from the crank of the imparting motion device, is connected at an intermediate point by a link 36 with a rocker arm 37, located above the eccentric arm and pivoted at one end by a transverse rod or pin 38, which is mounted in suitable bearings 39 of the sides of the gear frame. The upwardly extending link 36 has its ends bifurcated to straddle the eccentric arm and the rocker arm and is secured to the same by pivot bolts 40 and 41. The rocker arm 37 is provided at its pivoted end with a transverse sleeve 42, extending across the space between the bearings 39 and suitably fixed to the shaft or pivot 38, which also carries a depending arm 43, arranged at an obtuse angle to the rocker arm 37 and co-acting with the same to form a bell crank. The reciprocatory motion of the eccentric arm or rod 34 and the up and down movement of the same through the oscillatory means hereinafter described, cause the pivot 40 to travel in an elliptical path. The free end of the downwardly extending arm 43 is connected by a pivot bolt 44 to the rear end 45 of a link or rod 46, which has its front end 47 bifurcated and pivoted by a bolt 48 to the valve rod 49 of the locomotive. The bell crank formed by the rocker 37 and the depending arm 43 may be reversed to arrange the valve gear to suit either inside or outside admission valves. The rear end of the eccentric arm or rod 34 is connected by an end link 50 with the free rear end 51 of a rocker arm 52, which is pivoted at its other end 53 by a transverse pin 54, mounted in spaced bearings 55 of the sides of the gear frame. The link 50 has its terminals bifurcated and is connected by upper and lower pivot bolts 51ª and 52ª to the rear end of the eccentric arm or rod and to the rocker arm 52, which are arranged in the terminal bifurcations of the link 50. The rocker arm 52 is connected at an intermediate point by a pivot bolt 56 to the upper end of a radius link 57, having its upper portion 58 bifurcated to receive the rocker arm 52 and pivotally mounted at its lower end within and carried by a radius yoke 59. The radius yoke 59 is composed of two sides or members connected together at their lower ends 60 by a bolt 61, or other suitable fastening means and provided at their upper ends with laterally extending pivots 62, arranged in opposite bearings 63 of a reversing yoke 64. The lower end of the radius link 57 is arranged between the lower ends of the sides or members of the radius yoke, and is pivoted to the same by the bolts 61. The upper pivots or journals 62 of the radius yoke are secured in the bearing 63 by bolts 65, or other suitable fastening devices. The radius yoke is connected by a reciprocatory rod or member 66 with the eccentric arm or rod 34, being pivoted to the latter by a bolt 67, and to the former by the pivot bolt 61. The reversing yoke is substantially oblong, being composed of spaced sides connected at their upper ends by a transverse top portion 68. The sides of the reversing yoke are provided at their lower portions with laterally extending pivots or journals 69, which are arranged in bearings 70 of the sides of the gear frame. One side of the reversing yoke is provided with an integral horizontally projecting arm 71 to which is pivoted by a bolt 72 the forward end of a reach rod 73. The reach rods 73 of the valve gears at opposite sides of the locomotive are connected at their rear ends to upwardly extending arms 74 and 75 of a reversing shaft 76, journaled in suitable bearings and connected to the frame of the locomotive. The arm 74 is extended above the reach rod 73 and is connected with an ordinary reversing yoke (not shown). The reversing yoke, the radius yoke, and the radius link constitute a reverse or reversing mechanism, and is a modification of the "Marshall" reverse, and the radius yoke is adapted to be swung to either side of the vertical center to reverse the engine, and is capable of being arranged at various points between its extreme positions to vary the cut-off. The reverse or reversing mechanism and the means for mounting and connecting the same with the eccentric arm or rod constitute the valve gear proper, and is not claimed broadly in the present application, as it forms a portion of the subject-matter of the aforesaid application.

The oscillation of the radius yoke through the radius link raises and lowers the rocker arm 52 and imparts vertical movement to the rear end of the eccentric arm or rod 34, and the combined motions, the horizontal, reciprocatory and the vertical, cause the intermediate pivot 40 and the end pivot 52ª to travel in elliptical paths. The intermediate pivot describes a perfect ellipse, that is, an ellipse where there is an equal amount of travel on each side of the center line of motion modified by the radius of the intermediate link, and the end pivot describes a very distorted or elongated ellipse and compensates for and dissipates the evils in valve motion resulting from the angularity of the eccentric arm or rod. Heretofore when the valve actuating mechanism has been connected to the eccentric rod or arm at a point intermediate of the ends thereof by a pivot traveling in an elliptical path, the forward end of the eccentric arm has always traveled in a fixed or true arc or arcuate path, and the ellipse described by the intermediate pivot connected with the valve actuating mechanism is always irregular, being greater on the top side of the ellipse than on the bottom cause unequal valve travel and unequal distribution of steam. This evil was produced by connecting the end of the eccentric arm or rod directly to the radius link of a reverse of the "Marshall" type, and has been corrected by the employment of the rocker arm and the link connection, which produce the elliptical path of movement of the end 52ª of the eccentric arm or rod. An equal travel of the valve is thus secured during both strokes, producing uniform admission and release at each end of the cylinder and cut-off at equi-distant points at each end thereof. As the cylinders, pistons and cross heads together with the imparting motion devices, the valve gears and the mechanism for transmitting motion from the cross heads to the imparting motion devices are all mounted on and carried by the frame of the locomotive, perfect motion of uniform rotative speed is secured, and the action of the valve is undisturbed and unaffected by the vibratory lateral movement such as occurs in valve gears through the yielding of the springs in running over inequalities of the track, and the evils necessarily resulting from connecting a portion of the mechanism with the crank axle and another portion with the spring supported frame of the locomotive are prevented.

Having thus fully described my invention, what I claim as new and desire to secure by Letters Patent, is:—

1. The combination with an imparting motion device including a rotary shaft, and a plurality of crank elements, of mechanism for connecting the crank elements with the cross heads of a locomotive, and means for connecting the imparting motion device with a valve gear.

2. The combination with a valve gear, of an imparting motion device connected with the valve gear and including a rotary shaft having a pair of crank elements arranged at an angle, and mechanism for connecting the crank elements with the cross heads at opposite sides of a locomotive.

3. The combination with the valve gears of a locomotive, of imparting motion devices located at opposite sides of the locomotive and connected with the valve gears and including a rotary shaft, and a pair of cranks arranged at an angle, and means for connecting the cranks of each imparting motion device with each of the cross heads of the locomotive.

4. The combination with the valve gears of a locomotive, of imparting motion devices located at opposite sides of the locomotive and connected with the valve gears and including a rotary shaft, and a pair of cranks arranged at an angle, transverse rock shafts extending across the locomotive and each connected with one of the reciprocatory cross heads thereof, and means for connecting each rock shaft with one of the cranks of each of the imparting motion devices.

5. The combination with the valve gears of a locomotive, of imparting motion devices located at opposite sides of the locomotive and connected with the valve gears and including a rotary shaft, and a pair of cranks arranged at an angle, and transverse rock shafts extending across the locomotive and provided at opposite sides thereof with arms connected with the cranks of the imparting motion devices, each of the rock shafts having one of its arms connected to one of the cross heads.

6. The combination with the valve gears of a locomotive, of imparting motion devices located at opposite sides of the locomotive and connected with the valve gears and including a rotary shaft, and a pair of cranks arranged at an angle, transverse rock shafts extending across the locomotive and provided at its ends with arms, links or rods connecting the arms of the rock shafts with the cranks of the imparting motion devices, and means for connecting one of the arms of each of the rock shafts with one of the reciprocatory cross heads of the locomotive.

7. The combination with the valve gears of a locomotive, of imparting motion devices located at opposite sides of the locomotive and connected with the valve gears and including a rotary shaft, and a pair of cranks arranged at an angle, transverse rock shafts extending across the locomotive and provided with reversely arranged long and short arms, links or rods connecting the arms of the rock shafts with the cranks of the imparting motion devices, and means for connecting the long arms of the rock shafts with the reciprocatory cross heads of the locomotive.

8. The combination with the valve gears of a locomotive, of imparting motion devices located at opposite sides of the locomotive and connected with the valve gears and including a rotary shaft, and a pair of cranks arranged at an angle, transverse rock shafts extending across the locomotive and provided with reversely arranged long and short depending arms, the short arms being located at the opposite sides of the locomotive and connected with two of the cranks of the imparting motion devices, and the long arms being also arranged at the opposite side of the locomotive and forming levers connected at their lower ends with the reciprocatory cross heads of the locomotive and at an intermediate point with the other cranks of the imparting motion devices.

9. The combination with the valve gears of a locomotive, of imparting motion devices located at opposite sides of the locomotive and connected with the valve gears and including a rotary shaft, and a pair of cranks arranged at an angle, transverse rock shafts arranged in parallelism and extending across the locomotive and provided with reversely arranged long and short depending arms, approximately horizontal rods or links extending rearwardly from the arms of the rock shafts and connected with the cranks of the imparting motion devices, and other links arranged approximately horizontal and connecting the other arms of the rock shafts with the reciprocatory cross heads of the locomotive.

10. The combination with the valve gears of a locomotive, of imparting motion devices located at opposite sides of the locomotive and connected with the valve gears and including a rotary shaft, and a pair of cranks arranged at an angle, transverse rock shafts extending across the locomotive and provided with depending arms connected with the cranks of the imparting motion devices, plates carried by the reciprocatory cross heads of the locomotive and projecting therefrom to form rigid arms, and links pivoted to the plates and connected to one of the arms of each of the rock shafts.

11. The combination with the valve gears of a locomotive, of imparting motion devices located at opposite sides of the locomotive and connected with the valve gears and including a rotary shaft, and a pair of cranks arranged at an angle, transverse rock shafts extending across the locomotive and provided with depending arms connected with the cranks of the imparting motion devices, plates mounted on and carried by the reciprocatory cross heads of the locomotive and projecting rearwardly therefrom to form arms, and approximately horizontal links pivoted at their rear ends to the outer portions of the plates and connected at their front ends with an arm of each of the rock shafts.

12. The combination with the valve gears of a locomotive, of imparting motion devices located at opposite sides of the locomotive and connected with the valve gears and including a rotary shaft, and a pair of cranks arranged at an angle, transverse rock shafts extending across the locomotive and provided at their ends with reversely arranged long and short depending arms, links or rods connecting each of the arms of the rock shafts with a crank of each of the imparting motion devices, plates mounted on the cross head of the locomotive and extending rearwardly therefrom, and other links extending rearwardly from the long arms of the rock shafts and connected with the said plates.

13. The combination with the valve gears of a locomotive, of opposite imparting motion devices connected with the valve gears and including a rotary shaft, and crank elements arranged at an angle to each other, transverse rock shafts extending across the locomotive and arranged in advance of the imparting motion devices and provided with long and short depending arms, the long and short arms of one rock shaft being arranged the reverse to those of the other rock shaft, links or rods extending rearwardly from the arms of the rock shafts and connected with the cranks of the imparting motion devices, plates mounted on the cross heads of the locomotive and extending rearwardly therefrom, and other links extending rearwardly from the long arms of the rock shafts and connected with the outer portions of the said plates.

14. The combination with the valve gears of a locomotive, of imparting motion devices arranged in advance of the valve gears and including crank elements arranged at an angle to each other, transverse rock shafts located in advance of the imparting motion devices and having arms connected with the cranks thereof, and means for connecting one of the arms of each of the rock shafts with one of the cross heads of the locomotives.

15. The combination of imparting motion devices located at opposite sides of a locomotive and including crank elements arranged at an angle to each other, mechanism for connecting each imparting motion device with each of the cross heads of a locomotive, eccentric arms or rods located at opposite sides of the locomotive and actuated by the imparting motion devices, and valve gears connected with the eccentric arms or rods and located in rear of the imparting motion devices.

16. The combination of an imparting motion device including crank elements arranged at an angle to each other, mechanism for connecting the imparting motion device with each of the cross heads of a locomotive, an eccentric arm or rod extending rearwardly from the imparting motion device and actuated by the same, an intermediate rocker arm located above the eccentric arm or rod at a point intermediate of the ends thereof, an intermediate link connected with the rocker arm and with the eccentric arm or rod at a point between the ends of the latter, means for transmitting motion from the rocker arm to a valve, an end rocker, an end link connecting the end of the rocker arm with the eccentric arm or rod, and reversing mechanism having a radius link connected with the end rocker arm and with the eccentric arm or rod.

17. The combination of an imparting motion device including crank elements arranged at an angle to each other, mechanism for connecting the imparting motion device with each of the cross heads of a locomotive, an eccentric arm or rod extending rearwardly from the imparting motion device and actuated by the same, an intermediate rocker arm located above the eccentric arm or rod at a point intermediate of the ends thereof, an intermediate link connected with the rocker arm and with the eccentric arm or rod at a point between the ends of the latter, means for transmitting motion from the rocker arm to a valve, an end rocker arm located above the eccentric arm or rod and pivoted at its rear end, an end link connecting the end rocker arm with the rear end of the eccentric arm or rod, reversing mechanism having a radius link connected with the end rocker arm, and a rod connecting the radius link with the eccentric arm or rod.

18. The combination of a valve gear frame having bearings, an imparting motion device including a rotary shaft mounted in the bearings of the valve gear frame and having crank elements arranged at an angle, mechanism for connecting the crank elements with each of the cross heads of a locomotive, and valve gears mounted on the valve gear frame and actuated by the imparting motion device.

19. The combination of a valve gear frame having opposite bearings, an imparting motion device including a rotary shaft journaled in the bearings of the valve gear frame and having crank elements arranged at an angle, a bracket rigidly secured to the valve gear frame, mechanism supported by the said bracket for connecting the crank elements of the imparting motion device with each of the cross heads of a locomotive, and valve gears mounted on the valve gear frame and actuated by the imparting motion device.

20. The combination of valve gear frames located at opposite sides of a locomotive and having brackets rigidly connected with the valve gear frame at the front end thereof and provided with bearings, imparting motion devices including rotary shafts mounted in the bearings of the gear frames, and crank elements arranged at an angle to each other, transverse rock shafts journaled in the bearings of the brackets and supported by the latter and provided with depending arms, one of the arms of each rock shaft being extended to form levers located at opposite sides of the locomotive, links or rods pivoted to the said arms and connecting each of the rock shafts with a crank element of each of the imparting motion devices, and means for connecting the extended arms or levers with the cross heads of the locomotive.

In testimony, that I claim the foregoing as my own, I have hereto affixed my signature in the presence of two witnesses.

HENRY J. PILLIOD.

Witnesses:
CARL W. HUNT,
HARRY DE JOANNIS.